US008551598B1

(12) United States Patent
Coltrane et al.

(10) Patent No.: US 8,551,598 B1
(45) Date of Patent: Oct. 8, 2013

(54) ARMORING PANEL FOR RESISTING EDGE IMPACT PENETRATIONS BY BALLISTIC PROJECTILES

(75) Inventors: Michael D. Coltrane, Andover, KS (US); Bo McGown, Andover, KS (US); John Bockbrader, Wichita, KS (US)

(73) Assignee: Leading Technology Composites, Inc., Wichita, KS (US)

( * ) Notice: Subject to any disclaimer, the term of this patent is extended or adjusted under 35 U.S.C. 154(b) by 4 days.

(21) Appl. No.: 13/279,691

(22) Filed: Oct. 24, 2011

(51) Int. Cl.
  *B32B 5/22* (2006.01)
  *B32B 5/28* (2006.01)
  *B32B 7/12* (2006.01)
  *B32B 17/02* (2006.01)
  *B32B 17/06* (2006.01)
  *B32B 27/02* (2006.01)
  *B32B 27/32* (2006.01)
  *F41H 1/02* (2006.01)
  *F41H 5/08* (2006.01)

(52) U.S. Cl.
  USPC .......... 428/122; 428/121; 428/189; 89/36.02; 89/36.05; 2/2.5

(58) Field of Classification Search
  USPC .............. 428/121, 122, 189; 2/2.5; 89/36.02, 89/36.04, 36.05, 36.07, 36.08, 36.09
  See application file for complete search history.

(56) References Cited

U.S. PATENT DOCUMENTS

| | | | | |
|---|---|---|---|---|
| 3,859,892 A | * | 1/1975 | Coes | 89/36.02 |
| 6,708,595 B1 | * | 3/2004 | Chaussade et al. | 89/36.02 |
| 2005/0193667 A1 | * | 9/2005 | Henry et al. | 52/309.9 |

* cited by examiner

*Primary Examiner* — Maria Veronica Ewald
*Assistant Examiner* — Joanna Pleszczynska
(74) *Attorney, Agent, or Firm* — Kenneth H. Jack; Davis & Jack, L.L.C.

(57) ABSTRACT

An armoring panel for resisting edge impact penetrations by ballistic projectiles, the armoring panel including a strata having an outer stratum, an inner stratum, and a plurality of intermediate stratums, each stratum among the plurality of intermediate stratums being composed of ballistic fibers, having a lateral end, and having an oppositely lateral extension; at least a first durable sheet having an outer oppositely lateral extension, an inner oppositely lateral extension, and a delamination resisting tie section which spans between lateral ends of the outer and inner oppositely lateral extensions and laterally overlies the intermediate stratums' lateral ends, the outer stratum including the at least first durable sheet's outer oppositely lateral extension, and the inner stratum including the at least first durable sheet's inner oppositely lateral extension; and a bonding matrix interconnecting the strata's stratums.

7 Claims, 7 Drawing Sheets

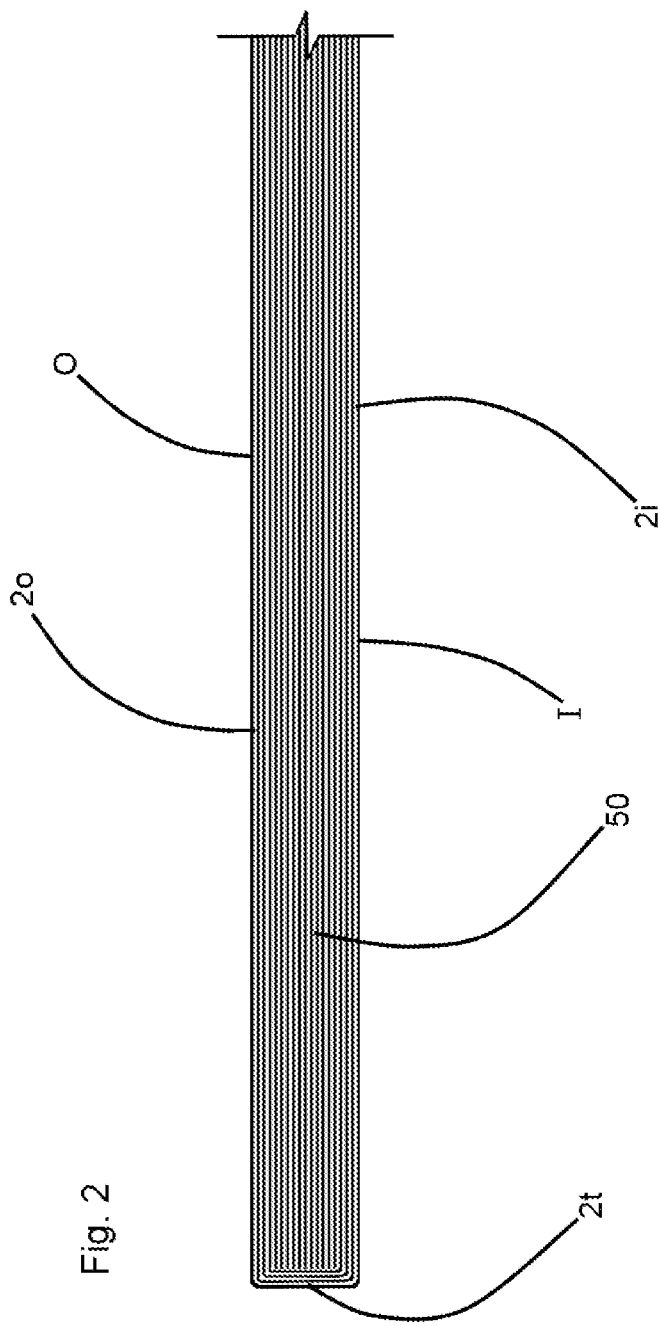

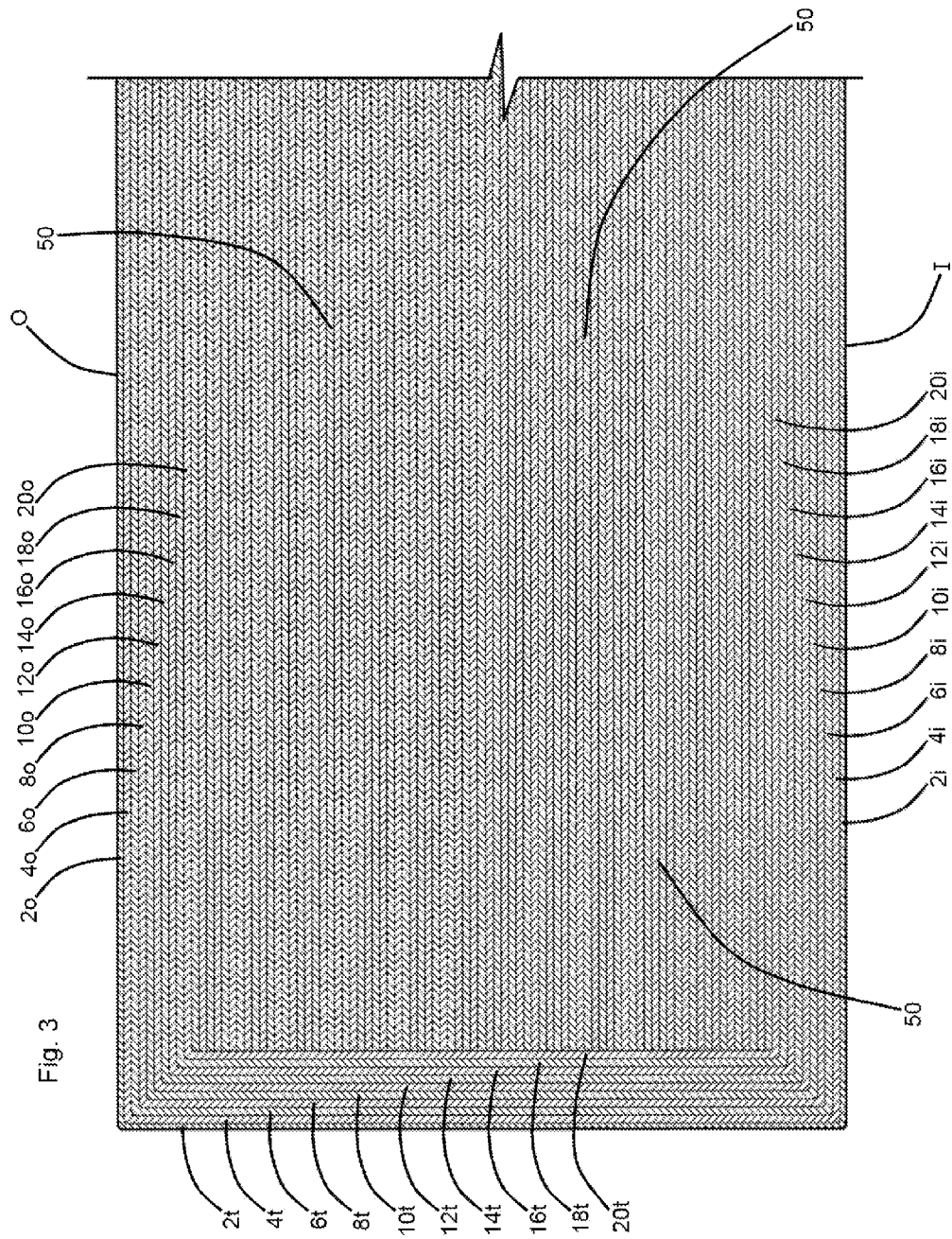

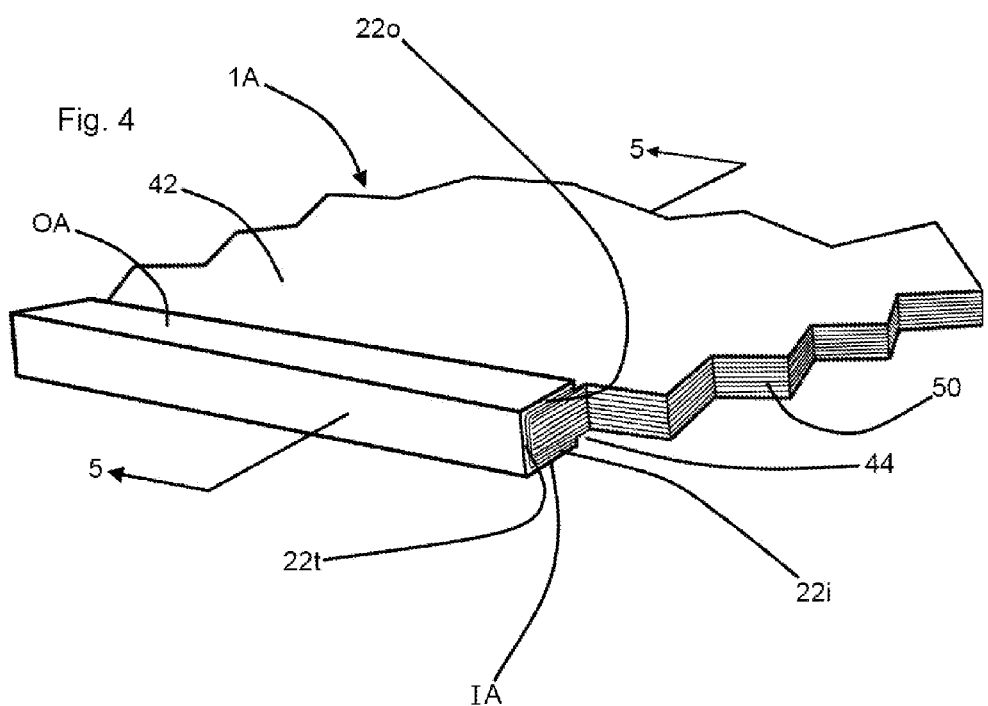

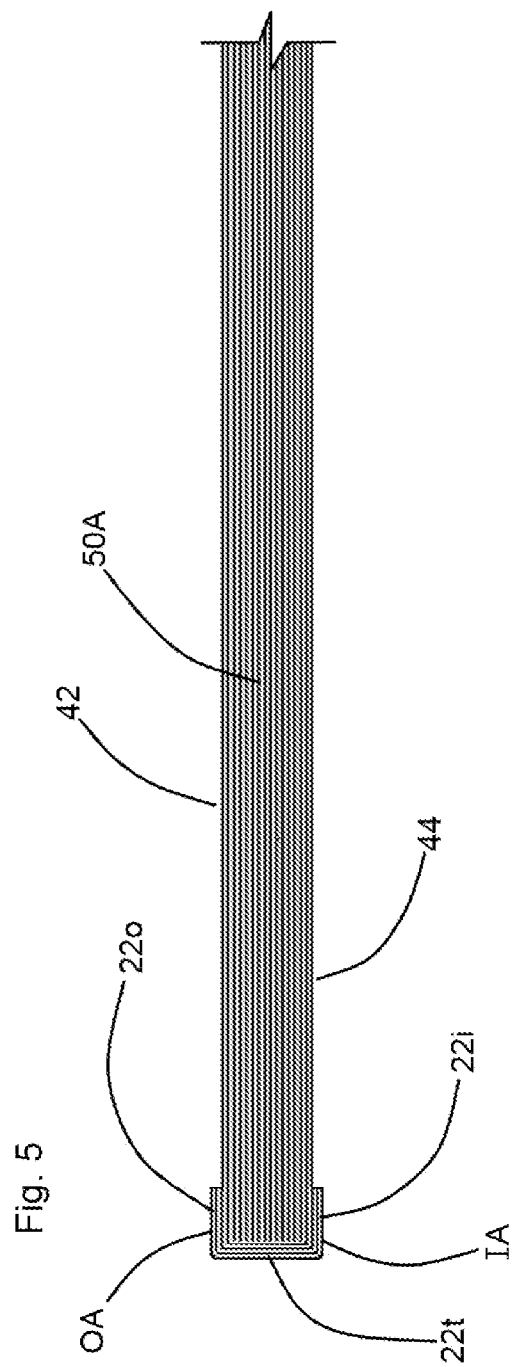

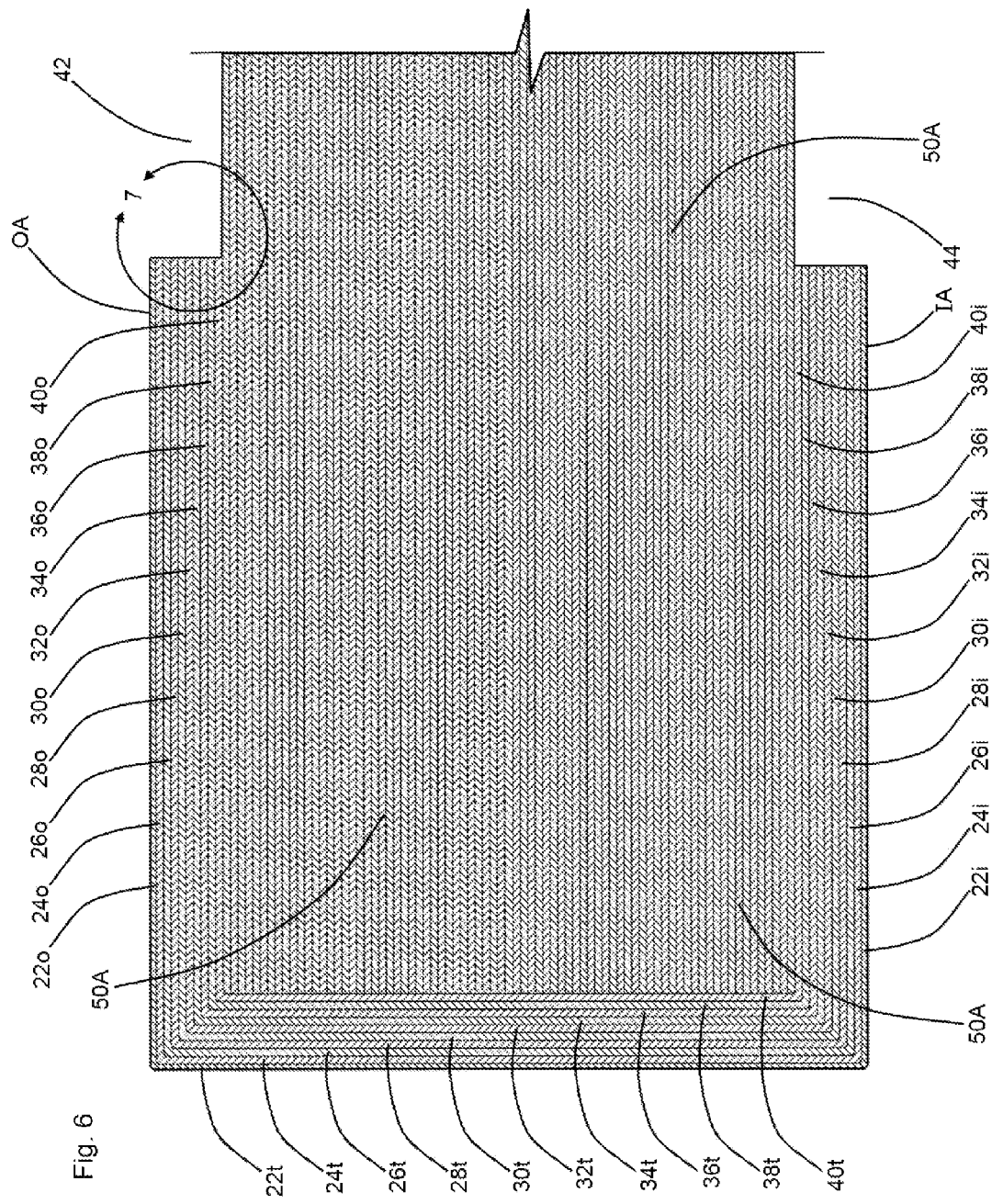

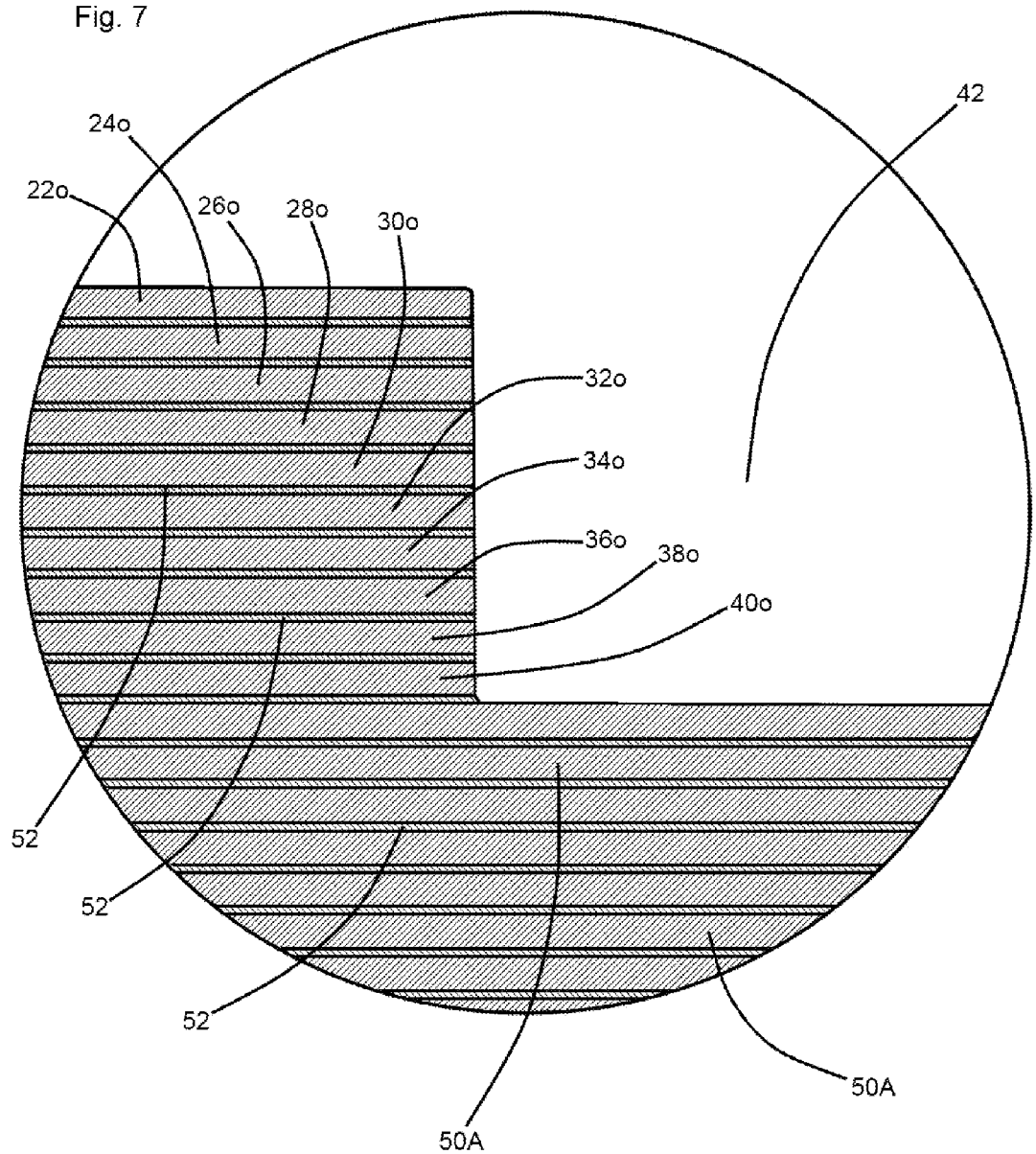

ARMORING PANEL FOR RESISTING EDGE IMPACT PENETRATIONS BY BALLISTIC PROJECTILES

FIELD OF THE INVENTION

This invention relates to armoring sheets and panels which are adapted for resisting penetrations by ballistic projectiles, such as rifle fired bullets. More particularly, this invention relates to such panels which comprise a strata of ballistic fibers.

BACKGROUND OF THE INVENTION

Laminate composites armoring panels which consist of layers or stratums of ballistic fibers are known. In a common mode of fabrication of such armoring panels, multiple layers of thin fabric whose fibers consist of high strength polymers such as polyaramid fibers are stacked one atop another, and within an interstitially disposed hardened adhesive or resin matrix, such matrix interconnecting the fiber fabric layers and forming a hardened panel.

A drawback or deficiency in the performance of such laminate composite armoring panels arises and is observable upon events where a projectile such as a rifle fired bullet strikes the panel at or near the panel's lateral edge. Upon such panel edge strikes, the kinetic forces imposed by the bullet upon the panel tend, in addition to the bullet's normal stratum penetrating effect, to delaminate the panel's stratums, tearing a stratum inwardly and away from its immediately overlying stratum. Such delaminations imposed by bullets at the panel's edge undesirably markedly reduce the panel's ability to suppress and prevent penetration by the bullet.

The instant inventive armoring panel for resisting edge impact penetrations by ballistic projectiles solves or ameliorates the problems, defects, and deficiencies discussed above by specially configuring an armoring panel so that the panel's outermost stratum continues over the panel's edge to form the panel's innermost stratum, and so that the next underlying panel stratums similarly continue over the panel's edge to form inner stratums, such continuations of stratums advantageously creating delamination resisting tie sections.

In ballistic projectile suppressing performance of the instant inventive panel, the portions of such outermost/innermost stratums which span across and overlie the panel's lateral edge surfaces advantageously function as suspension ties which directly resist and cancel delaminating forces which may be imposed by the projectile against the panel's lateral edge.

BRIEF SUMMARY OF THE INVENTION

A first structural component of the instant inventive armoring panel for resisting edge impact penetrations by ballistic projectiles comprises a laminate composite sheet or strata. In the preferred embodiment, the strata comprises an outer stratum, an inner stratum, and a plurality of intermediate stratums which are situated between the at least first outer and inner stratums.

The instant inventive armoring panel preferably further comprises at least a first durable sheet which itself comprises an outer oppositely lateral extension section, an inner oppositely lateral extension section, and a delamination resisting tie section. In the preferred embodiment, the at least first durable sheet's delamination resisting tie section spans between lateral ends of the at least first durable sheet's outer and inner oppositely lateral extensions, and such tie section is preferably positioned to laterally overlie the lateral ends of the panel's intermediate stratums. The strata's outer and inner stratums advantageously comprise the at least first durable sheet's outer and inner oppositely lateral extensions, such extensions operatively anchoring outer and inner ends of the delamination resisting tie.

A further structural component of the instant inventive armoring panel comprises a bonding matrix which fixedly and rigidly interconnects the strata's stratums, such matrix being interstitially disposed with respect to the stratums, to collectively form the stratums into the rigid armoring panel.

In operation of the instant inventive armoring panel, a ballistic projectile such as a rifle fired bullet may strike the panel upon its outer strike face and at the location near the panel's lateral edge. As such projectile travels through the panel's outer stratums, the projectile exerts forces against immediately underlying stratums which, in addition to the bullet's normal material puncturing effect, operates to tear apart or delaminate the stratums from each other at the vicinity of the impact. Stratums immediately underlying a point of delamination have markedly lessened penetration suppression capabilities.

The delamination resisting tie portion of the at least first durable sheet advantageously imposes oppositely or outwardly directed force vectors at the lateral ends of the panel's intermediate stratums, such opposing forces resisting and advantageously canceling the stratum delaminating effect of the projectile.

Stratum delaminations which occur at a panel edge located projectile impact unfavorably and disadvantageously lessen the ability of the panel to suppress projectile penetrations. The functional delamination resisting tie of the instant invention advantageously resists such projectile's delaminating force. Accordingly, the instant invention enhances or preserves the ability of an armoring panel to suppress projectile penetrations from bullets which impact at or near the panel's edge.

In the preferred embodiment of the instant invention, a plurality of second durable sheets is provided. Each sheet among such plurality of sheets has, like the overlying at least first durable sheet, outer and inner oppositely lateral extensions. Each outer and inner pair of such extensions is preferably interconnected by a wholly formed delamination resisting tie section, the extension sections serving as anchors at the outer and inner ends of the tie sections. Where such plurality of second durable sheets is provided, they preferably underlie and nest within the at least first durable sheet in the manner of reinforcing plys.

In the preferred embodiment, each of the strata's stratums comprises a ballistic fiber material selected from the group consisting of polyaramid fibers, extended chain polyethylene fibers, ultra-high molecular weight polyethylene fibers, nylon fibers, graphite fibers, semi-crystalline polystyrene fibers, alumino-boro-silicate glass fibers, and magnesia-alumina-silicate fibers. Also in the preferred embodiment, the bonding matrix comprises an adhesive or bonding resin material selected from the group consisting of phenolic resin, polyester resin, rubber compound resins, silicone resin, thermoplastic resins, polyepoxide, malamine, polyamides, polyvinyl butol, and polyolefins.

According to what is known in the laminate composite armoring panel fabrication arts, each of a panel's stratums conventionally functions as a single panel stratum. In contrast, in the instant invention, ballistic fiber sheet components are caused to perform multiple functions. For example, the at least first durable sheet component of the instant invention multiply functions as a projectile suppressing outer stratum, as a first anchor means for supporting the outer end of the durable sheet's delamination preventing tie section, as the delamination preventing tie section, as a projectile suppressing inner stratum, and as a second anchor means for supporting the inner end of the delamination preventing tie section. In the conventionally known configuration of a laminate composite armoring panel, its singularly functioning stratums of ballistic composite fibers contribute to and cause undesirable penetration suppression deficits at the panel's edges. The instant invention, through its conversion of panel stratums for performance of multiple functions, as described above, preserves all of the normal function of the old art single functioning stratums while curing those single functioning stratum's tendency to allow edge strike projectile penetrations.

Accordingly, objects of the instant invention include the provision of an armoring panel for resisting edge impact penetrations by ballistic projectiles which incorporates structures as described above, and which arranges such structures with respect to each other in manners as described above, for the performance of beneficial functions as described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 2 is a partial sectional view as indicated in FIG. 1.

FIG. 3 is a magnified view of a portion of the structure of FIG. 2.

FIG. 4 redepicts the structure of FIG. 1, the view of FIG. 4 showing the inventive armoring panel further including outer and inner materials saving void structures.

FIG. 5 is a partial sectional view as indicated in FIG. 4.

FIG. 6 is a magnified view of a portion of the structure of FIG. 5.

FIG. 7 is an alternative magnified partial view as indicated in FIG. 6.

DETAILED DESCRIPTION OF PREFERRED EMBODIMENTS

Figure 1:
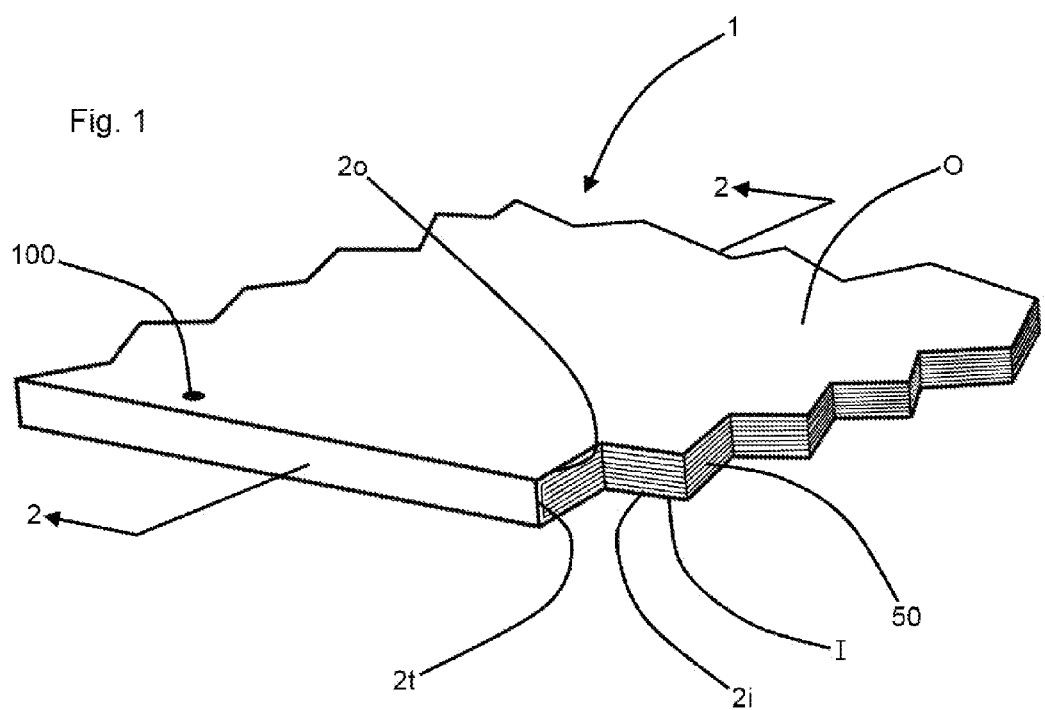
FIG. 1 is a perspective view of a portion of the instant inventive armoring panel for resisting edge impact penetrations by ballistic projectiles.

Referring now to the drawings, and in particular to FIG. 1, a suitable configuration of the instant inventive armoring panel for resisting edge impact penetrations by ballistic projectiles is referred to generally by Reference Arrow 1. The armoring panel 1 preferably comprises a strata which includes an outer stratum O and an inner stratum I. The strata preferably further comprises a plurality of intermediate stratums which are referred to generally by Reference Numeral 50, the intermediate stratums 50 being situated between the outer stratum O and the inner stratum I. In the preferred embodiment, the intermediate stratums 50 are composed of high strength ballistic fibers.

Referring further to FIG. 1, the outer and inner stratums O and I preferably comprise at least a first durable sheet, such sheet having an outer oppositely lateral extension portion 2*o* and an inner oppositely lateral extension section 2*i*. Such at least first durable sheet preferably further comprises a delamination resisting tie section 2*t*, such section 2*t* being positioned to directly laterally overlie the lateral ends of the intermediate stratums 50, and to span between and be securely supported or anchored at the lateral ends of the durable sheets' oppositely lateral extensions "2*o*" and "2*i*".

In the preferred embodiment of the armoring panel 1, each of the strata's stratums comprises a ballistic fiber material selected from the group consisting of polyaramid fibers, extended chain polyethylene fibers, ultra-high molecular weight polyethylene fibers, nylon fibers, graphite fibers, semi-crystalline polystyrene fibers, alumino-boro-silicate glass fibers, and magnesia-alumina-silicate fibers. The inventive panel preferably further comprises a bonding matrix which interconnects the strata's stratums, the bonding matrix preferably comprising an adhesive or bonding resin material selected from the group consisting of phenolic resin, polyester resin, rubber compound resins, silicone resin, thermoplastic resins, polyepoxide, malamine, polyamides, polyvinyl butol, and polyolefins. Referring further simultaneously to FIG. 7 (which represents a slightly different and preferred structural configuration which is further discussed below), the disposition of the bonding matrix with respect to the panel's multiple stratums is referred to generally by Reference Numeral 52, the bonding matrix within the FIG. 1 armoring panel 1 being situated and configured similarly with bonding matrix 52.

Referring simultaneously to FIGS. 1-3, it may be seen that the intermediate stratums 50 consist of a multiplicity of ballistic composite fiber layers, and that a plurality of second durable sheets, (4*o*, 4*t*, 4*i*), (6*o*, 6*t*, 6*i*), (8*o*, 8*t*, 8*i*), (10*o*, 10*t*, 10*i*), (12*o*, 12*t*, 12*i*), (14*o*, 14*t*, 14*i*), (16*o*, 16*t*, 16*i*), (18*o*, 18*t*, 18*i*), and (20*o*, 20*t*, 20*i*) are provided, each such second durable sheet underlying the at least first durable sheet (2*o*, 2*t*, 2*i*) in a reinforcing manner.

In operation of the instant inventive armoring panel, and referring simultaneously to FIGS. 1-3, a high speed ballistic projectile such as a rifle fired bullet may strike the armoring panel 1 at a location 100 which is near the panel's lateral edge. As such bullet passes through the outer oppositely lateral durable sheet extensions 2*o*-20*o*, and thence travels into and through the outermost intermediate stratums 50, such bullet tends to exert both penetrating or puncturing forces against the stratums and delaminating forces against the stratums. Upon such bullet's exertion of a delaminating force against one of the stratums 50, such one stratum is forcefully pulled inwardly and away from its immediately overlying stratum. Such pulling force exerts tension or pulls against the bonding matrix material which interconnects those two stratums. In the event that such bullet imposed tension force exceeds the tensile strength of the hardened bonding matrix, a delamination event may undesirably occur, allowing the underlying stratum to deflect downwardly at an angle with respect to the immediately overlying stratum. Occurrences of such delaminating downward deflections of an armoring panel's stratums markedly diminishes the underlying layers' ability to resist penetration by the ballistic projectile. As a result of such undesirable stratum delaminating effect, bullets striking the panel at or near its lateral edge pose a greater penetration threat than those which may impinge at medial areas of the panel.

The instant invention lessens or ameliorates such heightened penetration threat at panel edges through the function of the delamination resisting tie sections 2*t*-20*t*. In response to inwardly directed delamination forces which may be imposed by the exemplary bullet impinging against the panel's edge, near the lateral ends of the intermediate stratums 50, the tie sections 2*t*-20*t* simultaneously impose and equal an oppositely directed force, also at the lateral ends of the stratums 50, such opposite force cancelling the bullet's delaminating effect. Accordingly, the delamination resisting tie sections 2*t*-20*t* of the outer and inner durable sheets allow the armoring panel 1 to resist penetrations by bullets which strike at or near the panel's lateral edge equally with the panel's suppression of more medially striking bullets.

In FIGS. 4-7, reference numerals having the suffix "A" correspond structurally with similarly numbered referenced numerals appearing in FIGS. 1-3. Referring simultaneously to all figures, it may be seen that armoring panel 1A of FIG. 4 is configured substantially identically with the armoring panel 1 of FIG. 1, with the exception that armoring panel 1A includes materials saving void structures 42 and 44. The materials saving voids 42 and 44 respectively extend oppositely laterally from oppositely lateral ends of durable sheet extensions 22o-40o, and 22i-40i. The void providing structure of the panel of FIGS. 4-7 constitutes a preferred configuration since the panel's edge strike bullet suppression capability may be equalized with the panel's mid-panel strike suppression capability without extensions of the inner and outer stratums over the panel's medial portions. Thus, an advantage of materials, cost savings, and weight savings may be attained through the inclusion of the materials saving void structures 42 and 44 without compromising the overall performance of the armoring panel.

Where the materials saving voids 42 and 44 are incorporated, as preferred, the lengths of the durable sheets' outer and inner oppositely lateral extensions 22o-40o, and 22i-40i are preferably at least one inch. In any event, materials and cost savings resulting from provisions of the materials saving voids 42 and 44 may be realized when the lengths of the durable sheet's oppositely lateral extensions are substantially less than the lengths of the oppositely lateral extensions of the intermediate stratums 50A.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An armoring panel for resisting edge impact penetrations by ballistic projectiles, the armoring panel comprising:
    (a) a strata comprising an outer stratum, an inner stratum, and a plurality of intermediate stratums, each stratum among the plurality of intermediate stratums comprising ballistic fibers, having a lateral end, and having an oppositely lateral extension;
    (b) at least a first durable sheet comprising outer and inner oppositely lateral extensions, the outer and inner oppositely lateral extensions having lateral ends, the at least first durable sheet further comprising a delamination resisting tie section having outer and inner ends and having an oppositely lateral surface, the delamination resisting tie section's outer and inner ends being respectively formed wholly with the outer and inner oppositely lateral extension's lateral ends, and the delamination resisting tie section spanning between the outer and inner oppositely lateral extensions' lateral ends so that the delamination resisting tie section's oppositely lateral surface directly laterally overlies the intermediate stratums' lateral ends, the outer stratum comprising the at least first durable sheet's outer oppositely lateral extension, and the inner stratum comprising the at least first durable sheet's inner oppositely lateral extension; and
    (c) a bonding matrix interconnecting the strata's stratums.

2. The armoring panel of claim 1 wherein each of the strata's stratums comprises a ballistic fiber material selected from the group consisting of polyaramid fibers, extended chain polyethylene fibers, ultra-high molecular weight polyethylene fibers, nylon fibers, graphite fibers, semi-crystalline polystyrene fibers, alumino-boro-silicate glass fibers, and magnesia-alumina-silicate fibers.

3. The armoring panel of claim 2 wherein the bonding matrix comprises an adhesive or bonding resin material selected from the group consisting of phenolic resin, polyester resin, rubber compound resins, silicone resin, thermoplastic resins, polyepoxide, malamine, polyamides, polyvinyl butol, and polyolefins.

4. The armoring panel of claim 3 wherein the strata further comprises a plurality of second durable sheets, each sheet among the plurality of second durable sheets comprising an outer oppositely lateral extension, an inner oppositely lateral extension, and a delamination resisting tie section spanning between lateral ends of said each sheet's outer and inner oppositely lateral extensions, each sheet among the plurality of second durable sheets underlying overlying the at least first durable sheet.

5. The armoring panel of claim 4 wherein each oppositely lateral extension has a length, the lengths of the inner and outer durable sheets' oppositely lateral extensions being less than the lengths of the intermediate stratums' oppositely lateral extensions.

6. The armoring panel of claim 5 wherein the lengths of the inner and outer durable sheets' oppositely lateral extensions are at least one inch.

7. The armoring panel of claim 6 further comprising outer and inner materials saving voids, said voids respectively extending oppositely laterally from lateral ends of the durable sheets' outer and inner oppositely lateral extensions.

* * * * *